Nov. 29, 1960  C. E. RICKARD  2,962,314
GASKET
Filed July 9, 1958  2 Sheets-Sheet 1
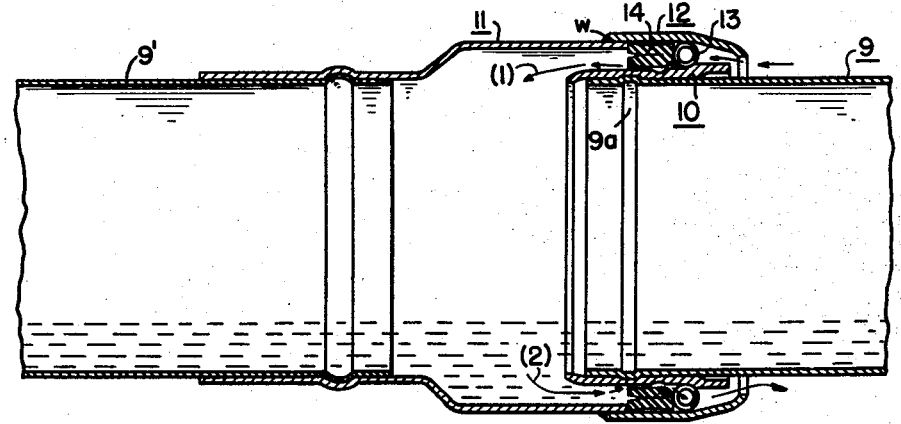
Fig. 1
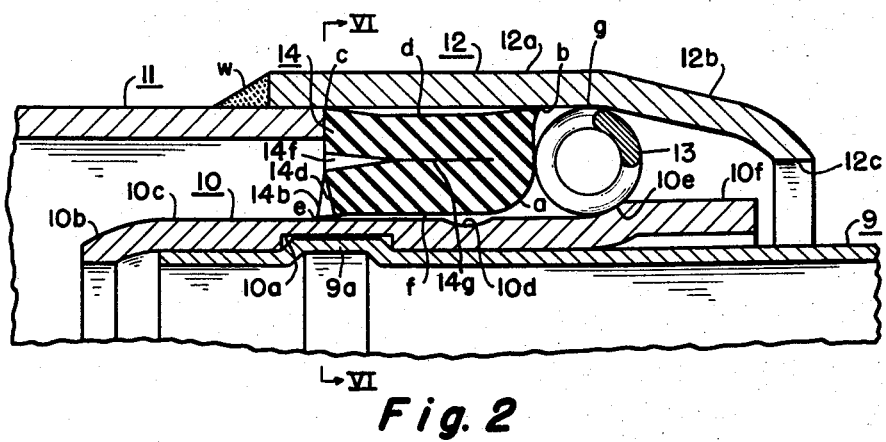
Fig. 2
Fig. 3
INVENTOR.
Clyde E. Rickard
BY
HIS ATTORNEYS Nov. 29, 1960    C. E. RICKARD    2,962,314
GASKET Filed July 9, 1958    2 Sheets-Sheet 2

INVENTOR.
Clyde E. Rickard
BY
HIS ATTORNEYS

United States Patent Office

2,962,314
Patented Nov. 29, 1960

2,962,314

GASKET

Clyde E. Rickard, Pittsburgh, Pa., assignor to McDowell Manufacturing Company, Millvale, Pa., a corporation of Pennsylvania Filed July 9, 1958, Ser. No. 747,478

1 Claim. (Cl. 288—5)

This invention relates to a valve joint coupling system for a pipe line which employs a valved drain gasket to seal-off a pipe joint under line pressure and to vent or drain fluid from the pipe line. More particularly, it relates to an improved valved drain gasket for draining the line when its sections are to be uncoupled and transported, and for venting the line when its sections have been coupled and liquid is to be introduced into the line under pressure. It also relates to an improved valve construction for normalizing air pressure and draining coupled sections which is operative peripherally about the sections and in co-operation with the joint between the sections.

The construction of my present invention has been devised particularly on the basis of the problem presented in connection with the employment of a series of interconnected pipe sections, such as employed in a portable irrigation system, and which may have suitable spray heads or openings along its length supplied with water under pump pressure. In such a system, the need is for a quick and positive acting valve which will quickly and effectively drain the pipe sections or the system when positive fluid pressure is released or water flow is stopped. The purpose is to automatically drain the sections of water, so that they may be uncoupled, transported to a new location, and re-employed. Upon re-employment of the sections when coupled together, a further factor arises in connection with atmospheric air in the pipe sections which has taken the place of the liquid. That is, I have determined it is important to provide effective means for venting such air to again quickly fill up the coupled sections with liquid under pressure and reinitiate an irrigating flow. In this connection, the air must be vented to substantially fully fill up the line with water and to apply the water under a uniform head, without spitting or surges due to entrained or entrapped air in the system.

As to the first portion of the problem relating to draining the pipe line, I have found that quick and effective drainage cannot be accomplished without immediate means for, in effect, providing an air pressure normalization or equalization within and without the pipe section from the standpoint of the atmospheric air. A simple example of this is the difficulty encountered in pouring fruit juice from a single opening in the lid of a can without an atmospheric air entry in a second opening in the lid.

I have discovered that drain valve constructions heretofore employed for irrigation pipe lines have been inefficient in their operation, because those devising them did not recognize the importance of proper air pressure equalization between the outside atmosphere and the atmosphere within the connected pipe sections and during both liquid draining and refilling operations. I have determined that an immediate or closely associated unobstructed air flow area is required for active co-operation with a liquid flow area and that reliance cannot be placed upon air flow through an active liquid flow area or upon some form of remotely located air flow area, such as through an open end of the pipe line or through a spray head. When a vent or airflow opening is remote from the active drainage area, any venting action accomplished is slow, inefficient and relatively ineffective, with the result that drainage is a relatively slow operation and air venting when fluid line pressure is again applied, is not substantially completely effected. The latter causes spitting of the spray heads and line surges which under some conditions may tend to release the holding action of coupled sections. Also, the type of drain valves now being used employ an opening in the bottom of the pipe section which necessitates somewhat accurately aligning each section from the standpoint of its drain opening when the sections are coupled together. In addition, there is a tendency for dirt and sludge to clog the opening and to adversely affect the operation of the valve.

In my previous solution to this problem, represented in my Patent No. 2,730,116, issued January 10, 1956, I provided an annular gasket having a plurality of spaced-apart valve openings or ports communicating between an expansion chamber in the front thereof, and a normally open continuous annular slot or passageway in the outer periphery of the gasket. This construction provided an adequate venting of the line with air, however, the extremely small passageway between the port and slot tended to become clogged with dirt and other foreign material after use. From the results obtained from this gasket, I discovered that to be absolutely foolproof, a valve drain gasket must have relatively wide or unobstructed flow passageways therein. However, to function as a sealing gasket when line pressure is applied, the flow passageways must be constructed, so that they will easily close and seal-off the flow of fluid through the drain passageway.

A further disadvantage encountered with my old type of gasket was the entrance of sand, dirt, and other foreign matter under the outer sealing lip, when the pipe line was subjected to a negative pressure. The negative pressure or vacuum would move the outer lip inwardly, and away from its sealing surface, and make a place for sand and other foreign objects to get under the lip. A subsequently applied positive pressure would then force the lip into its sealing position, however, a satisfactory seal was then difficult to obtain, due to the presence of sand and other foreign material between the outer lip and its sealing surface. The fact that the gasket had, in effect, only a single line contact with its outer sealing surface, increased the accessibility of the coupling to these foreign substances. In addition, the thin inner and outer lip wing sections were easily distorted and misaligned when moved back and forth during the coupling function.

My present invention is particularly applicable to the employment of a so-called quick type of release and fluid-pressure-actuated grip coupling as, for example, shown in the Beyer et al. Patent No. 2,259,453, of October 21, 1941. In this connection, the valve means of my invention is equally effective, regardless of whether or not the grip coil has an initial engagement with the pipe section to be held, or has a somewhat spaced or clearance relationship with respect thereto before line pressure is applied. In other words, the valve of my invention operates effectively, regardless of whether or not the coupled sections are initially loosely mounted for an easier releasing action, or are more tightly mounted to provide an initial mechanical holding action on the pipe sections. It permits the utilization of a gasket abutting or a tight relationship between the coupling body and the coupled pipe section or nose, even when no active line pressure is being applied.

It has thus been an object of my invention to provide an improved system for air pressure normalizing and draining a pipe line having coupled sections and particularly, quick-release coupled sections;

Another object of my invention has been to solve the problem heretofore presented in the art by conventional valve constructions utilized in connection with pipe sections;

A further object of my invention has been to develop an improved valve construction which will operate effectively in a peripheral manner about and in co-operation with the joint between a pair of coupled pipe line sections;

A still further object of my invention has been to devise an automatic relief and drain valve of simple construction which will enable a more speedy, efficient and effective utilization of pipe sections such as in an irrigation system;

An additional object of my invention has been to provide an improved valved drain gasket which will operate effectively under both super-atmospheric and sub-atmospheric pressures;

Another object of my invention has been to provide an improved valved drain gasket which has unobstructed free flowing discharge openings and which openings are automatically sealed upon the application of line pressure;

A further object of my invention has been to provide a valved drain gasket which has unobstructed free flowing discharge openings and which openings are automatically sealed upon the application of line pressure;

A further object of my invention has been to provide a valved drain gasket having area surface contact with its corresponding sealing surfaces when subjected to super-atmospheric line pressure, and which inhibits the introduction of foreign matter within the valve, even when subjected to a sub-atmospheric line pressure;

These and many other objects of my invention will appear to those skilled in the art from the following disclosure and drawings in which:

Figure 1 is a side elevational view in section of a coupling joint system employing my valve construction; in this figure, the valve construction is shown in an open relationship, with no fluid pressure in the line, and the line is being drained preliminarily to uncoupling its sections and moving it to another location;

Figure 2 is an enlarged fragmental section in elevation of the construction of Figure 1, showing in detail the position of my valved drain gasket when the pipe is being drained or vented;

Figure 3 is an enlarged fragmental elevational view similar to Figure 2, but showing the normal operating position of my new valved drain gasket when fluid pressure is introduced into the line;

Figure 4:
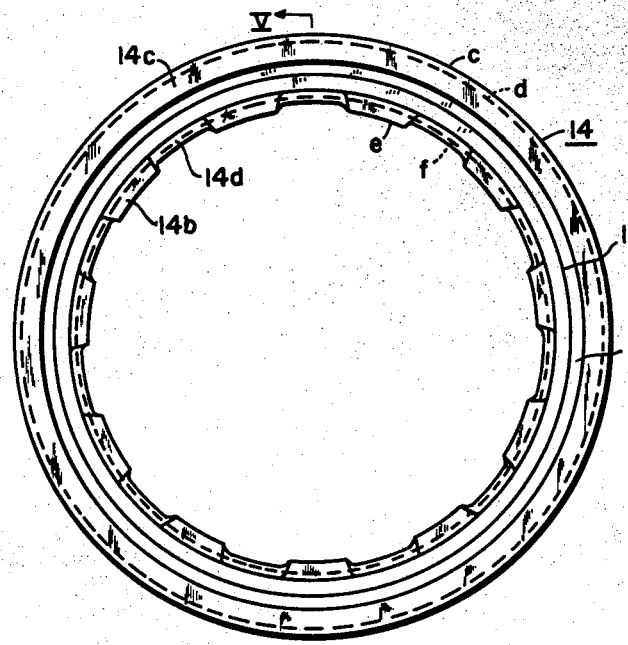
Figure 4 is a front view in elevation of the valve construction of my invention as employed in my drain gasket.

In the drawings, I have shown a representative type of coupling construction suitable for utilizing the valve construction of my invention. Referring particularly to Figure 1, the coupled pipe sections are represented by 9 and 9'. A coupling housing body 11 is shown mounted on and secured over the end portion of pipe section 9' by means of an offset rolled-out joint. A coupling body part 12 is secured as by weld metal $w$ to an outwardly-offset shoulder portion of the housing body 11.

The coupling body part 12 has a substantially uniform cylindrical attachment and sealing portion 12a, the inner cylindrical surface of which fits snugly over the outer end of the outwardly offset shoulder portion of coupling housing body 11, and also provides a sealing surface for the outer periphery of my valved drain gasket 14. The annular or cylindrical portion 12a of the coupling body member or part 12 has an inner diameter or periphery which is radially-outwardly offset with respect to the inner diameter or periphery of the shoulder portion of coupling housing body 11 and which, with the end or edge 11a of such portion, defines a positioning stop or abutment for an annular or continuous valved drain gasket 14. The grip-active fore portion of the coupling body part 12 has a forwardly-converging, smoothly-sloped, cone-shaped throat 12b which extends from the cylindrical portion 12a and terminates in an inwardly flanged lip or edge portion 12c.

The end portion of the other pipe section 9 is shown provided with an annular coupling nose or reinforcing sleeve 10. A rolled-out annular rim or flange 9a, adjacent the forward end of conduit 9, snaps into an annular recess 10a formed in the inner periphery of the sleeve 10 to frictionally clamp and retain the sleeve member 10 onto the conduit 9. The sleeve 10 is formed with an annular cylindrical attachment portion 10c adjacent the inner end of the conduit 9, and has the recessed annular groove portion 10a formed in its inner periphery, and further, has a sealing surface for the inner periphery of the gasket about its outer periphery. The forward end of the attachment portion 10c terminates into a radially-inwardly offset nose flange portion 10b. The outer end of the attachment portion 10c terminates in a radially-outwardly curvilinear offset stop shoulder or abutment portion 10e, backed by an offset cylindrical portion 10f. A locking recess portion 10d for the seating of a grip coil or annulus 13, when the coupling is subjected to a line surge for example, is provided in the outer periphery of the attachment portion 10c. The sleeve 10 extends into the coupling body part 12 and the coupling housing body 11 in an opposed and radially spaced-apart relation with the internal operating surface of the coupling body part 12.

The resilient or spring-like grip coil or annulus 13 has spaced-apart convolutions and is mounted in a cooperative relationship with the gasket 14 and in an operative relationship with respect to the throat portion 12b of the coupling, as well as with respect to the external or outer periphery 10c of the nose part 10. As shown, the gasket 14 may be a molded, one-piece construction of a suitable material, such as natural or synthetic rubber or of a flexible fabric or plastic material.

Figure 5:
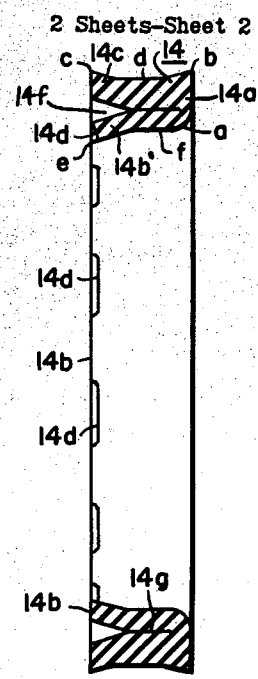
Figure 5 is a side elevational view in section taken along the line V—V of Figure 4.

The gasket 14, as shown particularly in Figures 4 and 5, has a pressure-sensitive heel or base portion 14a which cooperates with the grip coil 13 to advance it and hold it in a locking or gripping relationship between the throat portion 12b and the locking recess portion 10d in the nose part 10 on the pipe section 9. A pair of outwardly flared, forwardly-extending side wings 14b' and 14c, are integrally connected with the heel or base portion 14a and provided a V-shaped fluid-pressure-sensitive or expansion chamber 14f therebetween to receive fluid under pressure and to expand radially-outwardly, as well as press backwardly against the heel portion 14a when under positive line pressure. The back of the chamber is shown provided with a slit 14g formed at the apex of the V or internal chamber. The slit 14g provides an extended recess for fluid pressure to enter and thus, provides an added measure of outwardly-expanding pressure to seat and close-off the gasket, without losing structural support at the front of the wing portions. This feature is particularly important when the gasket is used under field conditions, since the slit gives the gasket greater flexibility and increases its sealing properties. For example, when the pipes in the field are not in correct alignment and are out of center, the extra flexibility derived from the slit 14g provides the necessary expansion to close and seal-off the joint.

The side wing 14b' and 14c both are relatively heavy or thick sections and therefore, are not easily distorted when moved back and forth during the coupling function. The inner side wing 14b' terminates in a plurality of pressure-sensitive circumferentially spaced-apart and radially-inwardly flanged spacing feet or seating sections 14b having a plurality of drain channel or recess portions 14d positioned therebetween. As noted in Figure 4, the seating sections 14b are positioned adjacent the drain channels 14d and alternate with one another circumferentially about the forward periphery of the inner side wing 14b'.

As noted particularly in Figures 2 and 5, the outer periphery of my valved drain gasket 14 is provided with an annular concaved section or recessed cavity d. The concaved section d terminates into a lip c adjacent the front of side wing 14c, and further terminates into a lip b adjacent the heel or back portion 14a. This particular construction of a concaved section enclosed between two sealing lip portions provides two important advantages. The first advantage is that it allows a tighter fit between the coupling body part 12 and the tube being coupled. Since initially there is only a line contact at each end of the gasket with the coupling body part 12 and the center portion is concaved inwardly, the center portion d may be flexed outwardly, permitting a tight fit. Secondly, the enclosed concaved section forms a seal to withstand a vacuum or negative pressure application when the pumping system is stopped and sub-atmospheric pressure is applied to the line. This situation is a common occurrence when pumping fluids from a well. When the pump stops or is turned off, the full column of fluid drops and thus creates a vacuum within the line that sucks air through the gasket. With my new type of gasket, having a double-sealed outer lip, the air is sucked in only through the inner lip adjacent the drain passageways. With the old type of gaskets, the sucking action would move the outer lip radially-inwardly and permit sand and other foreign material to become entrapped and embedded under the lip, with the result that it was extremely difficult, if not impossible, to obtain a satisfactory seal when line pressure was again restored, without requiring expensive and time consuming servicing and maintenance.

The heel portion 14a of the gasket 14 has a rounded or radius-shaped portion a adjacent its inner periphery f, and thus, allows the back outer lip b to deflect in a tightly positioned coupling, and also permits the coupling nose 10 to be easily inserted and guided within the coupling body part 12. The inwardly-flanged foot or seating sections 14b on the inner wing 14b' terminate into a radially-inwardly recessed lip or sealing section e at their forward inner peripheral edges.

Figure 6:
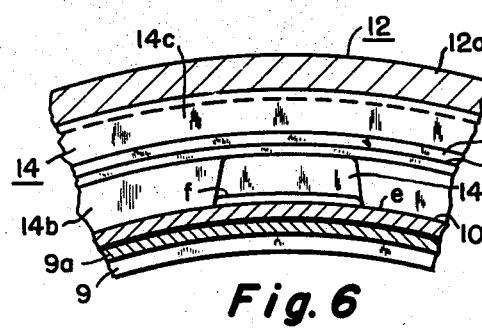
Figure 6 is a fragmental vertical section taken along the line VI—VI of Figure 2 and shows a discharge or drain passageway in its open position.

As noted in Figures 2, 3, and 5, the drain channels 14d are formed as diagonal slots within and about the forward edge of the gasket 14, and do not extend entirely therethrough. When the coupling is under no line pressure and the gasket is in its venting or discharge position, as shown in Figures 2 and 6, the gasket 14 is in double line contact at b and c with the inner sealing surface of seating section 12a and is in an intermittent line contact at sealing lips e with sealing surface portion 10c. The diameter of the forward inner peripheral sealing edges e is slightly smaller than the outer diameter of the cylindrical sealing surface 10c, so that the gasket 14 is mounted thereon with a compression fit at sealing lip portions e. However, this compression fit, as shown in Figures 2 and 6, is not so extensive so as to close off the discharge or drain channels 14d when the coupling is not under line pressure.

I have found that under laboratory conditions, the pressure exerted in expansion chamber 14f is sufficient to operatively seal the gasket 14, without the necessity of the added expanding-out pressure derived from the narrow chamber provided by the slit 14g. However, when the gasket is utilized under field conditions wherein the conduits and couplings have been abused and misused and sludge is picked up, the gasket may show a tendency to leak when the slit 14g is not used. I experimented with the concept of increasing the size of the expansion chamber 14f instead of slitting the apex, but I found this solution to the problem to be unsatisfactory, since this resulted in insufficient support for the forward ends of the wings 14c and 14b'. By utilizing a very thin slit, such as a deep knife slit, at the apex of the V, I have been able to achieve the necessary added expanding-out pressure to positively seal the wing portions 14c and 14b' against their respective sealing surfaces under all conditions of use including out of center alignments, without detrimentally losing the necessary structural support for the ends of the wings.

Figure 7:
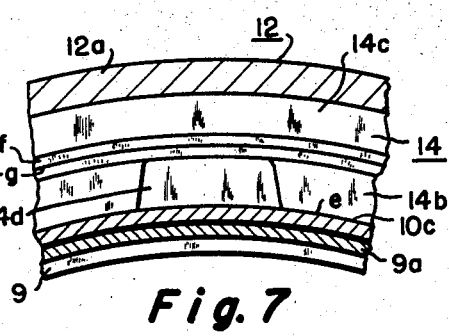
Figure 7 is a fragmental vertical section taken along the line VII—VII of Figure 3 and shows a discharge or drain passageway in a closed position.

When line pressure is applied to the coupling, the gasket 14 is pushed backwardly against the grip coil 13, as shown in Figure 3, and the discharge channels 14d are sealed-off by pressure within the expansion chamber 14f and the slit 14g to expand the wing 14d outwardly and downwardly against the sealing surface 10c (see Figures 3 and 7). When the gasket is pushed backwardly (forwardly towards the coupling throat 12b) it moves the annulus 13 forwardly into a wedging engagement h with the cone-shaped throat 12b as shown in Figure 3, as distinguished from the initial no pressure engagement g with the cylindrical portion 12a, as shown in Figure 2. Upon the application of a surging or high line pressure, conduit 9 will move backwardly until the annulus 13 drops into locking recess 10d and secures the conduits 9 and 9' together with annulus 13 wedged between recess 10d and the cone-shaped throat 12b. The sealing gasket 14 through the action of the pressure within expansion chamber 14f and slit 14g, is expanded outwardly to form an area sealing contact with the inner sealing surface of cylindrical section 12a, and also with the sealing surface section 10c (see Figures 3 and 7). Upon the release of line pressure, pressure is released in the expansion chamber and slit, and due to the resilient nature of the gasket, the wing portions are allowed to flex and the discharge passageways or channels are again opened to allow the conduits 14d to drain and vent, as shown by the arrows 2 and 1 respectively in Figure 1. Also, with line pressure released, the conical taper of cone-shaped throat part 12b tends to force the annulus 13 back into engagement with the cylindrical portion 12a at g, and the gasket 14 may be pushed back into abutment with edge 11a by the annulus, as shown in Figure 2.

Normally, when the coupled pipe sections 9 and 9' are empty or partially empty, as shown in Figure 1, there is an equalization of air pressure within and without the sections through the passageway of the gasket 14. However, when liquid is supplied under line pressure to an end of the pipe line through, for example, section 9, it will gradually build-up vertically in the connected pipe sections and progressively close-off the drain channels or passageways 14d from the lower towards the upper channels of the gasket. At the same time, the still-exposed or non-covered channels 14d adjacent the upper portion of the gasket are open, and are actively effective in venting air from the system. This continues until the pipe sections are fully filled up and at which time, as shown in Figure 7, all the ports are fully closed so that no leakage occurs.

On the other hand, when the line pressure is relieved and drainage is to be initiated, the rear or heel portion 14a of the gasket moves along its extent to the positioning illustrated by Figure 1, fully opening the channels 14d, initiating liquid drainage, and progressively makes the channels 14d from the top towards the bottom portion of the gasket, available for air flow which facilitates the drainage action. This is automatically and quickly effected, once positive line pressure on the liquid has been relieved.

Figure 8:
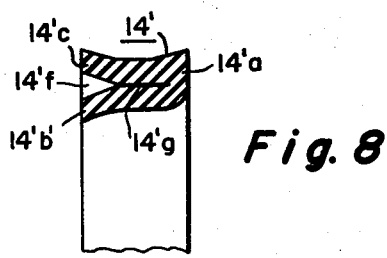
Figure 8 is a fragmental side elevational view in section showing a sealing gasket similar to the valved drain gasket, but without the discharge or drain openings or passageways.

Figure 8 shows a fragmental cross sectional view in elevation of a sealing gasket 14', similar to the valved drain gasket 14, having similar wing portions 14'b', 14'c and base portion 14'a, but not having the discharge channels 14d of the drain gasket 14. I have found that the construction of the sealing gasket 14' having slit 14'g' at the end of chamber 14f, gives excellent sealing properties in a coupling where drainage is not desired.

Although I have shown several preferred embodiments of my invention for the purposes of illustration, it will be apparent to those skilled in the art that many modifications and alterations may be employed, without departing from the spirit and scope of the invention, as indicated by the appended claim.

I claim:

An annular gasket for use in a coupling along a fluid conduit system comprising, inner and outer side wing portions integral with a heel portion, a V-shaped fluid-pressure-responsive expansion chamber formed between said side wing portions and opening forwardly of the gasket, said heel portion having an axially-extending annular slit communicating with and extending backwardly from the apex of the V-shaped expansion chamber to extend the expandable extent of said expansion chamber, and said inner and outer side wing portions being expandable outwardly into sealing engagemnt with opposed sealing surface portions of the coupling in response to fluid pressure exerted within said expansion chamber and said slit.

References Cited in the file of this patent
UNITED STATES PATENTS

| | | |
|---|---|---|
| 2,184,376 | Beyer et al. | Dec. 26, 1939 |
| 2,730,116 | Rickard | Jan. 10, 1956 |
| 2,797,937 | Frishhof | July 2, 1957 |
| 2,808,275 | Sherman | Oct. 1, 1957 |
| 2,820,569 | Peterson | Jan. 21, 1958 |
| 2,839,089 | Rickard et al. | June 17, 1958 |

UNITED STATES PATENT OFFICE
CERTIFICATION OF CORRECTION

Patent No. 2,962,314            November 29, 1960

Clyde E. Rickard

It is hereby certified that error appears in the above numbered patent requiring correction and that the said Letters Patent should read as corrected below.

Column 3, line 21, beginning with "A further object of my invention" strike out all to and including "of line pressure;" in line 24, same column; column 4, line 57, for "provided" read -- provide --; column 5, lines 5 and 6, for "hav-in" read -- hav-ing --.

Signed and sealed this 2nd day of May 1961.

(SEAL)
Attest:

ERNEST W. SWIDER
Attesting Officer

DAVID L. LADD
Commissioner of Patents